US008265266B2

(12) United States Patent
Ciet et al.

(10) Patent No.: US 8,265,266 B2
(45) Date of Patent: Sep. 11, 2012

(54) CRYPTOGRAPHIC METHOD COMPRISING SECURE MODULAR EXPONENTIATION AGAINST HIDDEN-CHANNEL ATTACKS, CRYPTOPROCESSOR FOR IMPLEMENTING THE METHOD AND ASSOCIATED CHIP CARD

(75) Inventors: Mathieu Ciet, La Ciotat (FR); Benoit Feix, La Ciotat (FR)

(73) Assignee: Gemalto SA, Meudon (FR)

( * ) Notice: Subject to any disclaimer, the term of this patent is extended or adjusted under 35 U.S.C. 154(b) by 1122 days.

(21) Appl. No.: 12/086,619

(22) PCT Filed: Dec. 22, 2006

(86) PCT No.: PCT/EP2006/070206

§ 371 (c)(1), (2), (4) Date: Jun. 16, 2008

(87) PCT Pub. No.: WO2007/074149

PCT Pub. Date: Jul. 5, 2007

(65) Prior Publication Data

US 2010/0014656 A1 Jan. 21, 2010

(30) Foreign Application Priority Data

Dec. 26, 2005 (FR) ..................................... 05 13305

(51) Int. Cl.
*G06F 21/00* (2006.01)

(52) U.S. Cl. ........................................... 380/28; 380/30

(58) Field of Classification Search ........................ None
See application file for complete search history.

(56) References Cited

U.S. PATENT DOCUMENTS

| | | | | |
|---|---|---|---|---|
| 6,064,740 | A * | 5/2000 | Curiger et al. | 380/265 |
| 6,304,658 | B1 | 10/2001 | Kocher et al. | |
| 6,748,410 | B1 * | 6/2004 | Gressel et al. | 708/491 |
| 7,787,620 | B2 * | 8/2010 | Kocher et al. | 380/29 |
| 2006/0023873 | A1 * | 2/2006 | Joye | 380/28 |
| 2009/0092245 | A1 * | 4/2009 | Fumaroli et al. | 380/28 |
| 2011/0131424 | A1 * | 6/2011 | Vigilant | 713/189 |
| 2011/0216900 | A1 * | 9/2011 | Yoon et al. | 380/28 |
| 2011/0246789 | A1 * | 10/2011 | Feix et al. | 713/190 |

FOREIGN PATENT DOCUMENTS

| | | |
|---|---|---|
| EP | 1 327 932 A1 | 7/2003 |
| WO | WO 01/28153 | 4/2001 |
| WO | 2005-048008 A2 | 5/2005 |

OTHER PUBLICATIONS

Elena Trichina and Antonio Bellezza. 2002. Implementation of Elliptic Curve Cryptography with Built-In Counter Measures against Side Channel Attacks. In Revised Papers from the 4th International Workshop on Cryptographic Hardware and Embedded Systems (CHES '02), Springer Verlag, London, UK, p. 98-113.*

Mesquita, D.; Badrignan, B.; Torres, L.; Sassattell, G.; Robert, M.; Bajard, J.-C.; Moraes, F.; , "A Leak Resistant Architecture Against Side Channel Attacks," Field Programmable Logic and Applications, 2006. FPL '06. International Conference on , vol., no., pp. 1-4, Aug. 28-30, 2006, doi: 10.1109/FPL.2006.311335.*

Kocher, "Timing Attacks on Implementations of Diffie-Hellman, RSA, DSS, and Other Systems", Cryptography Consultant, 1996, pp. 104-113.

PCT/ISA/210.

PCT/ISA/237.

* cited by examiner

*Primary Examiner* — Eleni Shiferaw
*Assistant Examiner* — Jeffery Williams
(74) *Attorney, Agent, or Firm* — Buchanan Ingersoll & Rooney PC

(57) ABSTRACT

A cryptographic method carries out a modular exponentiation of the type C=A<B1> mod N, where A is an operand, B1 is a first exponent, N is a modulus and C is a result. The method includes the steps of masking the operand A by a number s, carrying out a modular exponentiation of the masked operand by the exponent B1, and demasking the result of the exponentiation, by removing a contribution from the random number s from the result of the exponentiation. During the step of masking the operand A, the operand A is multiplied by a parameter of the form K<s.B2>, where K is a constant and B2 is a second exponent such that B1.B2=1 mod N. The method is implemented preferably by using a Montgomery multiplier. The preferred choice for the constant K is $K=2^p$, p being an integer lying between 0 and n, n being an upper bound of the size of the modulus N and conventionally depending on the choice of implementation of the Montgomery multiplication.

13 Claims, No Drawings

CRYPTOGRAPHIC METHOD COMPRISING SECURE MODULAR EXPONENTIATION AGAINST HIDDEN-CHANNEL ATTACKS, CRYPTOPROCESSOR FOR IMPLEMENTING THE METHOD AND ASSOCIATED CHIP CARD

The invention relates to a cryptographic method secured against hidden-channel attacks during which, in order to carry out modular exponentiation of type $C=A^{B1}$ mod N, where A is an operand, B1 a first exponent, N is a modulus and C is a result, the following steps are carried out, consisting of:

E1: masking the operand A by a number s, s being a random number or a number resulting from a function generating a deterministic series of numbers s, or a fixed secret number, E2: carrying out a modular exponentiation of the masked operand by the exponent B1, then E3: demasking the result of the exponentiation, by removing a contribution from the random number s from the result of the exponentiation.

Such methods are particularly interesting for asymmetric signature and encryption applications. A can therefore be, according to the application, a message to sign, check, encrypt or decrypt. B1 is a public or private key, according to the application. C is a result, according to the invention, a signed or decrypted message.

Masking the number A by a number s is a known countermeasure for securing modular exponentiation operations, in particular when they are implemented in chip-card type microcircuits, against so-called side-channel or hidden-channel attacks, allowing information to be obtained on the number B1.

A first countermeasure known from document D1 (Timing Attack on Implementations of Diffie-Hellman, RSA, DSS and Other Systems, Paul Kocher, Crypto 1996, LNCS Springer) consists of obtaining a random number s, calculating $s^{B2}$, where B2 is a private or public key associated with B1, then multiplying $s^{B2}$ by A ($s^{B2}$.A), raising the result of the multiplication to the power of B1 ($(s^{B2}.A)^{B1}$) then reducing modulo N. B1 and B2 being a public key and an associated private key such that B1.B2=1 modulo $\phi$(N), where $\phi$ represents the Euler function, such that the result ($(s^{B2}.A)^{B1}$) modulo N is simplified to give ($s.A^{B1}$) modulo N. A division by s finally makes it possible to obtain the desired result, $C=A^{B1}$ modulo N. This solution is certainly efficient, but it is expensive to implement. Indeed, in order for the measure to be effective, it is essential for $s^{B2}$ to be greater than A. This means that s must be a large number, more precisely larger than the size of A divided by the size of B2. If B2 is small (for example less than seventeen bits), s must be large (for example more than the number of bits of the modulus divided by seventeen). The production of large random numbers requires the use of a large generator which, on the one hand, consumes a considerable amount of power and, on the other hand, requires a considerable amount of time, which is not always compatible with chip-card applications. In addition, a long time might be required to carry out the division.

A second countermeasure, known mainly from document D2 (J. S. Coron, P. Paillier, "Countermeasure method in an electronic component which uses an RSA-type public key cryptographic element" patent number FR 2799851. Publication date Apr. 20, 2001. Int Pub Numb. WO0128153) consists of using two random numbers s1, s2 to carry out the operation $(A+s1.N)^{B1}$ mod (s2.N). Then, at the end of the calculation, the contribution provided by s1 and s2 is removed. Since s1 and s2 can be small in size, they are easier to obtain. However, this method requires carrying out an operation modulo s2.N. This requires the use of a larger multiplier and is not always compatible with chip-card applications.

One aim of the invention is to provide a solution for carrying out a modular operation of type $A^{B1}$ mod N that is more interesting than known solutions as it is less expensive to implement.

For this reason, the invention provides for masking the operand A by multiplying the operand A by a parameter in the form $K^{s.B2}$, where K is a constant (possibly public) and B2 is a second exponent such that B1.B2=1 mod $\phi$(N).

For the foreseen cryptographic applications, B1 and B2 are naturally associated private and public keys.

During the demasking step after exponentiation, the contribution $K^s$ provided by the random number s is removed.

In the invention, the random number s is, on the one hand, multiplied by B2 and, on the other hand, it placed as an exponent. Thus, the parameter $K^{s.B2}$ is large enough to mask the operand A, even when s is small. With the invention, it is not therefore necessary to have a large random-number generator.

Another aim of the invention is to provide a method that is quick to implement.

For this reason, in a preferred embodiment of the invention, the steps of masking E1, exponentiation of E2 and demasking E3 are carried out using a Montgomery multiplier, which has the advantage of carrying out modular multiplications which are particularly quick to execute compared with conventional multipliers and very useful for exponentiation.

Preferably also, the constant K is chosen to be equal to $2^p$, p being an integer comprised between 0 and n, n being an upper bound of the size of the modulus N. Upper bound of the size of the modulus N is understood here to be a number equal to or slightly larger than the size of n, and typically depending on the choice of implementation of the Montgomery multiplication and/or the hardware capabilities of the processor in which the multiplication is implemented. For example, if N is a 520-bit number, and if the processor used works with 576-bit words, n will advantageously be chosen to be equal to 576 bits.

The choice of the constant $K=2^P$ makes it possible advantageously to use the properties of the Montgomery multipliers to speed up the calculations while guaranteeing the security of the method. The choice of a number p=n such that $K=2^n$ is optimum as will be seen below.

The invention also relates to a cryptoprocessor comprising in particular a Montgomery multiplier for implementing a method such as described above.

The invention finally relates to a chip card comprising a cryptoprocessor such as described above.

The invention will be better understood and further characteristics and advantages of the invention will appear clearly from the description provided below, by way of non-limiting example, of the preferred embodiment of the invention.

As mentioned above, the invention relates to a secured cryptographic method during which, in order to carry out modular exponentiation of type $C=A^{B1}$ mod N, where A is an operand, B1 a first exponent, N is a modulus and C is a result, the following steps are carried out, consisting of:

E1: masking the operand A by a random number s,

E2: carrying out a modular exponentiation of the masked operand by the exponent B1, then E3: demasking the result of the exponentiation, by removing a contribution from the random number s from the result of the exponentiation.

According to the invention, during step E1 of masking the operand A, the operand A is multiplied by a parameter in form $K^{s.B2}$, where K is a constant and B2 is a second exponent such that B1.B2=1 mod φ(N). In this way, a masked operant is obtained, $A'=K^{s.B2}.A$. The exponentiation of A' (step E2) by B1 produces the masked result $C'=K^s.A^{B1}$ mod N. Finally, during step E3, the contribution $K^s$ provided by the random number s is removed to obtain the desired result C.

The invention is preferably implemented using a Montgomery multiplier.

Before providing a more complete description of the method of the invention, it is convenient to remember certain known properties of a Montgomery multiplier, described for example in document D3 (P. L. Montgomery, Modular Multiplication without trial division, Mathematics of computation, 44(170) pp 519-521, April 1985).

A Montgomery multiplier makes it possible to carry out multiplications of type $Mgt(A,B,N)=A.B.R^{-1}$ mod N. One advantage of this multiplier is its calculation speed. One disadvantage of this multiplier is that it introduces a constant R, called Montgomery constant, to the calculation. R is a power of 2 coprime with N: R=2 with n such that GCD(R, N)=1.

The Montgomery constant is intrinsic in the multiplier and it is necessary to remove its contribution in the early stages of the calculation, during the calculation or at the end. Thus, to calculate C=A.B mod N, it is possible for example first to calculate A.R then Mgt(A.R,B,N)=A.B mod N. It is also possible to carry out a first multiplication $C_0$=Mgt(A.R, B.R, N)=A.B.R mod N followed by a second multiplication of type C=Mgt(1, $C_0$, N)=A.B mod N.

The Montgomery multiplier also makes it possible to carry out modular exponentiations of type C=MgtExp(A,B, N)=$AB.R^{-(B-1)}$ mod N or C=MgtExp(A.R,B,N)=$A^B$.R mod N (in this case the constant $R^{-B}$ introduced by the calculation is compensated by multiplying A by R in the early stages of the calculation). Concretely, to carry out a Montgomery exponentiation, an algorithm such as that commonly referred to as "square and multiply" is executed, consisting, in a loop indexed by i varying between q−1 and 0, q being the size of the number B, of a succession of multiplications of type $U_i$=Mgt($U_{i-1}$, $U_{i-1}$, N) and possibly Mgt($U_i$, A, N) (or Mgt($U_i$, A.R, N)), according to the value of a bit $B_i$ of B associated with the index i, $U_i$ being a loop variable initialised at the value $U_q$=R. This exponentiation is explained in greater detail in document D4 (Handbook of Applied Cryptography by A. Menezes, P. Van Oorschot and S. Vanstone, CRC Press 1996, chapter 14, algorithm 14.94). This exponentiation calculation has the advantage of being particularly quick.

Montgomery operations have the following main characteristics, which will be used subsequently:

$$Mgt(A,B,N)=A.B.R^{-1} \bmod N$$

$$Mgt(A.R,B.R,N)=A.B.R \bmod N$$

$$Mgt(1,1,N)=Mgt(N-1,N-1,N)=R^{-1} \bmod N$$

$$Mgt(A,1,N)=Mgt(N-A,N-1,N)=A.R^{-1} \bmod N$$

$$MgtExp(A.R,B,N)=A^B.R \bmod N$$

In the preferred embodiment of the method of the invention, Montgomery multiplications and exponentiations are used to speed up the calculation of exponentiation masked by the random number $K^{s.B2}$.

Initially, during step E1 of masking the operand A, the following substeps are carried out, which consist of:

E11: carrying out a first Montgomery exponentiation of the constant K by the result of multiplying the random number s by the second exponent B2; the mask $K^{s.B2}$ mod N is obtained in this way, then E12: carrying out a Montgomery multiplication of the result of the first Montgomery exponentiation (=the mask $K^{s.B2}$) by the operand A to produce a masked operand A' ($A'=K^{s.B2}$.A mod N).

Then, during the step of exponentiation of the masked operand A', the following substep is carried out:

E212: carrying out a second Montgomery exponentiation of the masked operand A' by the first exponent B1 to produce a masked result C'.

Finally, during step E3 of demasking the masked result, the following substeps are carried out:

E31: carrying out a third Montgomery exponentiation to calculate the parameter $K^{-s}$, E32: carrying out a Montgomery multiplication of the masked result C' by $K^{-s}$.

As mentioned previously, Montgomery multiplications and exponentiations introduce a contribution in the result which depends on the Montgomery constant R. This constant can be eliminated at the end of each multiplication, for example by carrying out a Montgomery multiplication by $R^2$ after a calculation. When this is possible, and in particular for the exponentiations, it is easier to compensate the constant R in an earlier stage, by multiplying the operand by the constant R, rather than compensating a power of R (especially a negative power of R) at the end.

Likewise, a correct choice of the constant K makes it possible further to increase the speed of the calculation, in particular in step E31 of the calculation of $K^{-s}$. More precisely, choosing a constant $K=2^p$ (p being comprised between 0 and n) with the same form as the Montgomery constant $R=2^n$, makes it possible to simplify the calculations. The following appears in particular:

$$\begin{aligned}
Mgt(1, 1, N) &= Mgt(N-1, N-1, N) \\
&= R^{-1} \bmod N \\
Mgt(A, 1, N) &= Mgt(N-A, N-1, N) \\
&= A \cdot R^{-1} \bmod N \\
Mgt(2^p, 1, N) &= Mgt(N-1, N-1, N) \\
&= 2^p \cdot 2^{-n} \bmod N \\
&= (2^{n-p})^{-1} \bmod N \\
Mgt(2^{n-p}, 1, N) &= Mgt(N-2^{n-p}, N-1, N) \\
&= 2^{n-p} \cdot 2^{-n} \bmod N \\
&= (2^p)^{-1} \bmod N,
\end{aligned}$$

with $2^{n-p} = R/K$

The calculation of the inverse of K and then $K^{-s}$ is thus facilitated.

After various simplifications following the choice of $K=2^p$, a method is finally obtained comprising all the following steps.

E0: initialisation:

E011: choosing an integer j and calculating the constant $K=R/2^j$, (as $R=2^n$, $K=2^p$ with p=n−j)

E012: choosing a random number s and multiplying it by B2 to obtain s1,

E013: calculating $R^2$,

E1: masking A as A'

E11: calculating the mask $K^{s1}$

E111: calculating T1=Mgt(K,$R^2$,N)=K*R mod N; this step makes it possible to compensate upstream the contribution of R in the following exponentiation E112: calculating U1=MgtExp(T1,s1,N)=$K^{s1}$*R mod N E12: masking A as A'

E121: calculating M1=Mgt(U1,A,N)=$K^{s1}$.A mod N

E2: calculating C'=$A'^{B1}$ mod N

E211: calculating M2=Mgt(M1,$R^2$,N)=$K^{s1}$.A.R mod N; this step makes it possible to compensate upstream the contribution of R in the following exponentiation E212: calculating U2=MgtExp(M1,B1,N)=$A^{B1}$.$K^s$.R mod N E3: finding C based on C'

E31: calculating $K^{-s}$

E311: calculating I1=Mgt($2^j$,1,N)=$K^{-1}$ mod N

E312: calculating I2=Mgt(I1,$R^2$,N)=$K^{-1}$.R mod N

E313: calculating V=MgtExp(I2,s,N)=$K^{-s}$.R mod N

E32: calculating C=C'.$K^{-s}$

E321: calculating U3=Mgt(U2,V,N)=$A^{B1}$.R mod N

E322: calculating U4=Mgt(U3,1,N)=$A^{B1}$ mod N

It should be noted that, when implementing the above method in a cryptoprocessor, the same register or part of the memory can be used to store intermediate variables, with names containing the same letter: M1, M2 can be stored in succession in a register M, the same goes for variables I1, I2, which can be stored in the same register I, and variables U1, U2, U3, U4 can be stored in the same register U.

The particular choice of K=$2^n$ makes it possible further to speed up the calculation since the fact that K=R allows further simplifications.

After simplification, the following method is obtained:

E0: initialisation:

E012: choosing the random number s and calculating s1=s.B2+1.

E013: calculating $R^2$,

E1: masking A as A'

E11: calculating the mask $R^{s1}$

E112: calculating U1=MgtExp($R^2$,s1,N)=$R^{s1}$*R mod N

E12: masking A as A'

E121: calculating M1=Mgt(U1,A,N)=$R^{s1}$*A mod N=$R^{s.B2}$.A.R mod N

E2: calculating C'=$A'^{B1}$ mod N

E212: calculating U2=Mgt(M1,B1,N)=$A^{B1}$.$R^s$.R mod N

E3: finding C based on C'

E31: calculating $R^{-(s+1)}$

E313: calculating V=MgtExp(1,s+1,N)=$R^{-(s+1)}$.R mod N

E32: calculating C=C'.$K^{-(s+1)}$

E321: calculating U3=Mgt(U2,V,N)=$A^{B1}$ mod N

Compared with the general case where K=$2^p$, the following simplifications have been made:

K being equal to R, step E011 becomes needless, step E111 also becomes needless since R2 is already calculated during step E013, by calculating s1=s.B2+1 (instead of s1=s.B2) during step E012, step E211 becomes needless, $R^{-1}$ is calculated immediately, rendering steps E311 and E312 needless by choosing s=s+1 in step E31 it is possible to skip step E222.

Evidently, in the method described above, certain steps can be moved or switched around. For example, in the initialisation step E0, the substeps can be carried out in a different order.

As was seen above, the invention can advantageously be implemented to carry out the exponentiation C=$A^{B1}$ mod N in the following three steps:

E1: A'=A.$K^{s.B2}$ (masking of A)

E2: C'=$A'^{B1}$ mod N (exponentiation)

E3: C=C'*$K^{-s}$ (demasking)

The invention can also be advantageously combined with the Chinese Remainder Theorem to speed up the exponentiation calculation. This is commonly referred to as RSA-CRT.

According to the Chinese Remainder Theorem (CRT), known from document D5 (Cryptography Theory and Practice, chapter 4, Douglas R. Stinson, 1995, CRC Press), a conventional exponentiation calculation C=$A^{B1}$ mod N can be broken down as follows:

Cp=(A mod p) $B^{p1}$ mod p

C1=(A mod 1)$B^{q1}$ mod q

C=Cq+q*(Iq*(Cp−Cq)mod p)mod N where p and q are two prime integers such that p*q=N, Bp1=B1 mod(p−1)

Bq1=B1 mod(q−1)

Iq=$q^{-1}$ mod p

Applied to this CRT breakdown, the invention leads to the following method:

E1: masking the operand A (A'=$K^{u.B2}$*A) by a number u equal to twice the number s, multiplying the operand A by a parameter $k^{u.B2}$, E2: calculating C' using the Chinese Remainder Theorem (exponentiation):

$$Cp' = (A' \bmod p)^{B1p} \bmod p;$$
$$Cq' = (A' \bmod q)^{B1q} \bmod q;$$
$$C' = Cq' + q * (Iq.(Cp' - Cq') \bmod p) \bmod N$$
$$= K^u * A^{B1} \bmod N$$
$$= K^{2s} * C' \bmod N$$

E3: C=C'*$K^{-2s}$ (demasking)

Preferably, for an easier calculation, $K^2$ is calculated first, and then $(K^2)^{-s}$.

In one variation, it is also possible to carry out the following:

E1: masking the operand A by a number u equal to twice the number s, as follows:

$$Ap' = K^{u.B2} * A \bmod p$$
$$Aq' = K^{u.B2} * A \bmod q$$

E2: calculating C' using the Chinese Remainder Theorem (exponentiation):

$$Cp' = (Ap')^{B1p} \bmod p;$$
$$Cq' = (Aq')^{B1q} \bmod q;$$
$$C' = Cq' + q * (Iq.(Cp' - Cq') \bmod p) \bmod N$$
$$= K^u * A^{B1} \bmod N$$
$$= K^{2s} * C' \bmod N$$

E3: C=C'*$K^{-2s}$ (demasking)

In a preferred embodiment of the invention, a constant K=$2^{max(size(p),\ size(q))}$=2r is chosen, where r is the largest size between the size of p and the size of q. This choice allows simplifications when implementing the method using a Montgomery processor.

It is then noted that in step E3 the value $K^2$ in $(K^2)^{-s}$ is suitable for modular Montgomery operations on the module N knowing that the size of N is less than or equal to the sum of the sizes of p and q, size(N)≦size(p)+size(q)≦2*max(size (p),size(q)).

It should be noted finally that the method of the invention can be combined with previous methods to further increase the security of the method.

For example, in addition to masking A by $K^{s.B2}$, it is also possible to use a random number s2 to mask N, as described in document D2 and the prior art of the present document. If the Chinese Remainder Theorem is used, it is also possible to mask p and q by s2.

The invention claimed is:

1. Cryptographic method during which, in order to carry out a modular exponentiation of type $C=A^{B1}$ mod N, where A is an operand comprising a message on which a cryptographic operation is being performed, B1 is a first exponent, N is a modulus, and C is a result, comprising the following steps:

masking, by a cryptographic device, the operand A by a random number s, carrying out, by the cryptographic device, a modular exponentiation of the masked operand by the exponent B1, then demasking, by the cryptographic device, the result of the exponentiation, by removing a contribution from the random number s from the result of the exponentiation, to thereby obtain a signed, encrypted or decrypted version of said message, wherein during the step of masking the operand A, the operand A is multiplied by a parameter in the form $K^{s.B2}$, where K is a constant and B2 is a second exponent such that B1.B2=1 mod ϕ(N).

2. Method according to claim 1, wherein the step of masking the operand A comprises the following substeps:

carrying out, by the cryptographic device, a first Montgomery exponentiation of the constant K by the result of multiplying the random number s by the second exponent B2, then carrying out, by the cryptographic device, a Montgomery multiplication of the result of the first Montgomery exponentiation by the operand A to produce a masked operand A' ($A'=K^{s.B2}$).

3. Method according to claim 2, wherein the exponentiation step comprises the following substep:

carrying out, by the cryptographic device, a second Montgomery exponentiation of the masked operand A' by the first exponent B1 to produce a masked result C'.

4. Method according to claim 3, wherein the step of demasking the result of the exponentiation comprises the following substeps:

carrying out, by the cryptographic device, a third Montgomery exponentiation to calculate the parameter $K^{-s}$, carrying out, by the cryptographic device, a Montgomery multiplication of the masked result C' by $K^{-s}$.

5. Method according to claim 2, wherein the constant K is equal to $2^p$, p being an integer between 0 and n, n being an upper bound of the size of the modulus N.

6. Method according to claim 5, wherein the constant K is equal to $2^n$.

7. Method according to claim 5, comprising the following steps and subsets:

initialisation:

choosing an integer j and calculating the constant $K=R/2^j$, choosing a random number s and multiplying it by B2 to obtain s1, calculating $R^2$, R being a Montgomery constant equal to $2^n$, masking A as A', calculating the mask $K^{s1}$ calculating $T1=Mgt(K,R^2,N)=K*R$ mod N calculating $U1=MgtExp(T1,s1,N)=K^{s1}*R$ mod N masking A as A' calculating $M1=Mgt(U1,A,N)=K^{s1}.A$ mod N calculating $C'=A'^{B1}$ mod N calculating $M2=Mgt(M1,R2,N)=K^{s1}.A.R$ mod N calculating $U2=MgtExp(M1,B1,N)=A^{B1}.K^s.R$ mod N finding C based on C' calculating $K^{-s}$ calculating $I1=Mgt(N-2^j,N-1,N)=Mgt(2^j,1,N)=K^{-1}$ mod N calculating $I2=Mgt(I1,R^2,N)=K^{-1}.R$ mod N calculating $V=MgtExp(I2,S,N)=K^{-s}.R$ mod N calculating $C=C'.K^{-s}$ calculating $U3=Mgt(U2,V,N)=A^{B1}.R$ mod N calculating $U4=Mgt(U3,1,N)=A^{B1}$ mod N.

8. Method according to claim 6, comprising the following steps and substeps:

initialisation choosing the random number s and calculating s1=s.B2+1 calculating $R^2$, masking A as A' calculating the mask $R^{s1}$ calculating $U1=MgtExp(R^2,S1,N)=R^{s1}.R$ mod N masking A as A' calculating $M1=Mgt(U1,A,N)=R^{s1}*A$ mod $N=R^{s.B2}.A.R$ mod N calculating $C'=A'^{B1}$ mod N calculating $U2=Mgt(M1,B1,N)=A^{B1}.R^s.R$ mod N finding C based on C' calculating $R^{-(s+1)}$ calculating $V=MgtExp(1,s+1,N)=R^{-(s+1)}.R$ mod N calculating $C=C'.K^{-(s+1)}$ calculating $U3=Mgt(U2,V,N)=A^{B1}$ mod N.

9. Method according to claim 1, wherein the steps of masking, modular exponentiation and demasking are modified as follows:

masking, by the cryptographic device, the operand A ($A'=K^{u.B2}*A$) by a number u equal to twice the number s, multiplying the operand A by a parameter $K^{u.B2}$;

carrying out, by the cryptographic device, a modular exponentiation of the operand masked by the exponent B1, broken down according to the Chinese Remainder Theorem into the following substeps:

Cp=(A mod p) $BP^1$ mod p,

C1=(A mod 1) $B^{q1}$ mod q

C=Cq+q*(Iq*(Cp−Cq) mod p) mod N damasking, by the cryptographic device, the result of the exponentiation (C'), multiplying the result of the exponentiation (C') by $K^{-2s}$ mod N, where p and q are two integers which multiplied give the result of N (p*q=N), Bp1 is equal to B1 modulus p−1, Bq1 is equal to B1 mod q−1, Iq is equal to $q^{-1}$ mod p.

10. Method according to claim 9, wherein K is equal to 2r, where r is the largest size from among the size of p and the size of q.

11. A cryptoprocessor device comprising a Montgomery multiplier configured to implement a method to carry out a modular exponentiation of type $C=A^{B1}$ mod N, where A is an operand comprising a message on which a cryptographic operation is being performed, B1 is a first exponent, N is a modulus, and C is a result, comprising the following steps:

masking the operand A by a random number s, carrying out a modular exponentiation of the masked operand by the exponent B1, then demasking the result of the exponentiation, by removing a contribution from the random number s from the result of the exponentiation, to thereby obtain a signed, encrypted or decrypted version of said message, wherein during the step of masking the operand A, the operand A is multiplied by a parameter in the form $K^{s.B2}$, where K is a constant and B2 is a second exponent such that B1.B2=1 mod $\phi(N)$, wherein the step of masking the operand A comprises the following substeps:

carrying out a first Montgomery exponentiation of the constant K by the result of multiplying the random number s by the second exponent B2, then carrying out a Montgomery multiplication of the result of the first Montgomery exponentiation by the operand A to produce a masked operand A'($A'=K^{s.B2}$).

12. The cryptoprocessor device of claim 11 wherein the cryptoprocessor device is comprised within a Chip card.

13. Method according to claim 1, wherein the cryptographic device is a chip card.

* * * * *